(12) United States Patent
Wieth et al.

(10) Patent No.: US 8,746,709 B2
(45) Date of Patent: Jun. 10, 2014

(54) SHOPPING CART WITH A MAGNIFYING GLASS

(76) Inventors: Franz Wieth, Puchheim (DE); Horst Sonnendorfer, Puchheim (DE)

( * ) Notice: Subject to any disclaimer, the term of this patent is extended or adjusted under 35 U.S.C. 154(b) by 174 days.

(21) Appl. No.: 13/146,699

(22) PCT Filed: Feb. 4, 2010

(86) PCT No.: PCT/DE2010/000128
§ 371 (c)(1),
(2), (4) Date: Jul. 28, 2011

(87) PCT Pub. No.: WO2010/099772
PCT Pub. Date: Sep. 10, 2010

(65) Prior Publication Data
US 2011/0278806 A1 Nov. 17, 2011

(30) Foreign Application Priority Data

Feb. 4, 2009 (DE) ..................... 20 2009 001 362 U
Oct. 21, 2009 (DE) ..................... 20 2009 014 266 U

(51) Int. Cl.
*B62B 9/08* (2006.01)
(52) U.S. Cl.
USPC ............................. 280/33.994; 280/33.992
(58) Field of Classification Search
USPC ....................... 280/33.992, 33.994
See application file for complete search history.

(56) References Cited

U.S. PATENT DOCUMENTS

| 3,955,884 | A | * | 5/1976 | Del Pesco, Sr. ............... 359/804 |
| 4,021,953 | A | * | 5/1977 | Couch ............................. 40/308 |
| 4,474,282 | A | * | 10/1984 | Lenander ....................... 194/247 |
| 4,573,564 | A | * | 3/1986 | Rheeder et al. ............... 194/250 |
| 4,589,538 | A | * | 5/1986 | Payraudeau ................... 194/205 |
| 4,645,057 | A | * | 2/1987 | Schramme et al. ........... 194/246 |
| 4,691,816 | A | * | 9/1987 | Trubiano ....................... 194/212 |
| 4,773,660 | A | * | 9/1988 | Trubiano ................. 280/33.994 |
| 5,040,656 | A | * | 8/1991 | DiPaolo et al. ............... 194/212 |
| 5,121,823 | A | * | 6/1992 | Wanzl et al. .................. 194/253 |
| 5,131,517 | A | * | 7/1992 | DiPaolo et al. ............... 194/257 |
| 5,220,987 | A | * | 6/1993 | DiPaolo et al. ............... 194/212 |
| 5,236,073 | A | * | 8/1993 | DiPaolo et al. ............... 194/212 |
| 5,259,633 | A | * | 11/1993 | Sonnendorfer et al. .. 280/33.994 |
| 5,540,316 | A | * | 7/1996 | DiPaolo et al. ............... 194/212 |
| 5,573,097 | A | * | 11/1996 | Merchel ........................ 194/212 |
| 5,847,883 | A | * | 12/1998 | Rispoli, Sr. ................... 359/802 |
| 5,950,792 | A | * | 9/1999 | DiPaolo ......................... 194/212 |
| 5,951,029 | A | * | 9/1999 | Sonnendorfer et al. .. 280/33.992 |
| 6,137,639 | A | * | 10/2000 | Woolwine ..................... 359/802 |
| 6,250,451 | B1 | * | 6/2001 | Thirkill ......................... 194/205 |
| 6,262,854 | B1 | * | 7/2001 | Perrelle et al. ................ 359/802 |
| 6,441,974 | B1 | * | 8/2002 | Miranda et al. ............... 359/811 |
| 6,597,523 | B2 | * | 7/2003 | Giampavolo et al. ........ 359/802 |
| 6,830,252 | B2 | * | 12/2004 | Eberlein et al. .......... 280/33.994 |
| 6,903,882 | B1 | * | 6/2005 | Cameron et al. ............. 359/803 |
| 2008/0106050 | A1 | * | 5/2008 | Jurgen et al. ............. 280/33.994 |

FOREIGN PATENT DOCUMENTS

| DE | 200 11 735 U1 | 12/2000 |
| DE | 20 2005 006 627 U1 | 9/2005 |
| DE | 10 2004 042 433 A1 | 3/2006 |
| GB | 2 393 526 A | 3/2004 |
| WO | 02/25346 A1 | 3/2002 |

* cited by examiner

*Primary Examiner* — Jeffrey J Restifo
(74) *Attorney, Agent, or Firm* — Laurence A. Greenberg; Werner H. Stemer; Ralph A. Locher

(57) ABSTRACT

A magnifying glass that is mounted on the shopping cart can be moved from a protected neutral position into the reading position only when no key is in the coin deposit lock, and the key can be inserted into the lock only after the magnifying glass has been placed into the protected neutral position.

9 Claims, 2 Drawing Sheets

SHOPPING CART WITH A MAGNIFYING GLASS

BRIEF SUMMARY OF THE INVENTION

1. Technical Area

The invention relates to a pushing handle for shopping carts comprising a magnifying glass with the help of which the customer of a supermarket can more easily read information on the packaging of an article.

2. Prior Art

Such a pushing handle is known from DE 202005006627 U1. There, a magnifying glass is disclosed which is fastened to the hand grip in a fixed and not removable manner.

This has the disadvantage that the utilisation is ergonomically uncomfortable, since the articles to be looked at have to be held under the handle bar. The basket flap is also located there and not enough space is available for looking at larger product packages.

From DE 102004042433 A1 a magnifying glass fastened to the shopping cart is known, which, capable of being pulled out of a holder via a self-retracting cable, is connected to the shopping cart. This also allows looking at larger product packages, but disadvantageous with this solution is that the user only has one free hand left. A further disadvantage lies in that the magnifying glass can be pulled out at any time and the magnifying glass is not specifically protected when the shopping cart is parked-off in a collecting garage for shopping carts.

DISCLOSURE OF THE INVENTION

Technical Object

The object of the invention is to create a magnifying glass for a shopping cart, which makes possible an ergonomically comfortable use and wherein the magnifying glass is protected when the shopping cart is parked off in a collecting garage.

Technical Solution

The considerations which led to the creation of the present invention where based on that the magnifying glass is only required during the use of the shopping cart and can be stored in a protected manner the remainder of the time.

The set object is solved by means of the considerations that the magnifying glass is fastened to the shopping cart via a pivot mechanism on the pushing handle of the shopping cart or via a pivot mechanism on a deposit lock assigned to the shopping cart, wherein
  the magnifying glass can assume a rest position in which it contacts the pushing handle of the shopping cart or the housing of the deposit lock in a protected manner and can assume a reading position, in which it is located distant from the pushing handle or from the housing of the deposit lock and in which a comfortable perusal is possible.

Considerations going beyond this led to the realisation that the magnifying glass assumes the rest position at the time when the shopping cart is pushed into another shopping cart. These considerations then led to the further realisation that the magnifying glass first has to have assumed the rest position before the deposit coin can be removed and subsequently the magnifying glass is fixed in the rest position by a key inserted in the deposit lock.

Advantageous Effects

This advantageously causes that the magnifying glass is in the rest position whenever the shopping cart is parked off in a collecting location. This rest position is a position in which the magnifying glass is better protected from harmful effects than in the reading position.

Because of this it is possible as reading position to select a position which is located far distant from the pushing handle or coin lock and the user can thus comfortably look also at a larger product package without coming into contact with the pushing handle or the basket flap.

In the following, two exemplary embodiments of the invention are explained in more detail by means of Figures. It shows, in each case in sectional representation:

DESCRIPTION OF THE INVENTION

Figure 1:
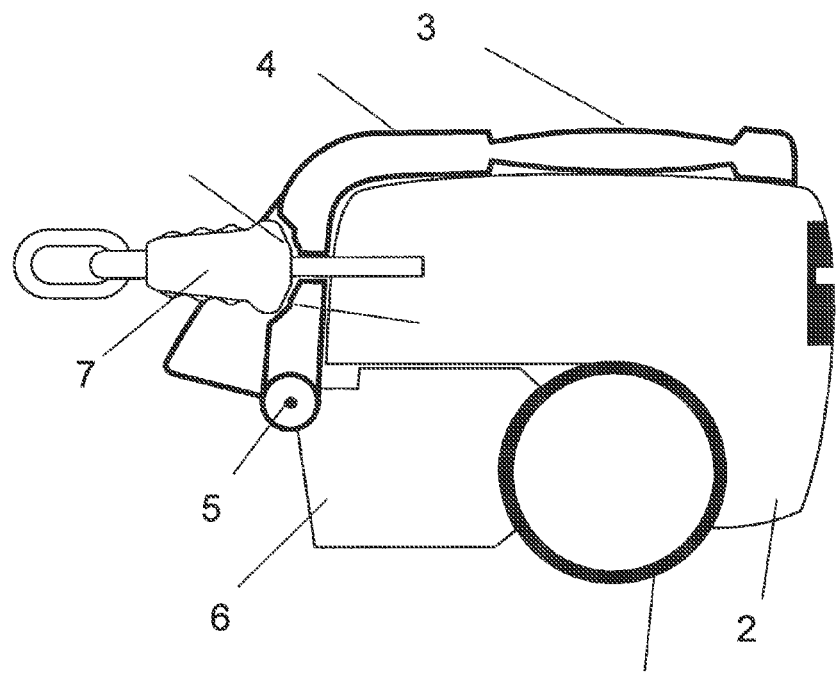
FIG. 1 a first example of the magnifying glass in rest position.

On a handle 1 a deposit lock 2 is mounted. The magnifying glass 3 is integrated in a holding part 4. The holding part 4 is rotatably connected to the deposit lock 2 via a bearing 5.

In the drawn embodiment the bearing 5 is located on a clamping part 6. This clamping part 6 is used in order to fasten the deposit lock 2 to the handle 1. Since the clamping part 6 is a part independent of the remaining deposit lock 2 this solution provides the advantage that an existing deposit lock can be quickly and cost-effectively retrofitted with a magnifying glass in that solely the existing clamping part is replaced with the new clamping part according to the invention.

Likewise it is obviously possible to mount a deposit lock with a magnifying glass during the initial assembly.

According to the inventive idea it is also a realisable solution if the bearing for the holding part is located on the main housing of the deposit lock.

In the FIG. 1 a key 7 is visible, which is inserted in the deposit lock 2 and held in the interior of the deposit lock 2 by the holding mechanism.

For the sake of clarity the representation of the holding mechanism has been omitted since this is known anyway to the person skilled in the art.

The key 7 has a key handle 7a, whose side directed towards the deposit lock 2 pushes against a contact surface 4a of the holding part 4.

Because of the kinematic conditions the holding part 4 via the bearing 5 and the key handle 7a pushing against the contact surface 4a is now fixed.

The magnifying glass 3 rests on the top of the deposit lock 2.

The design can also be configured so that the key handle 7a correspondingly firmly pushes against the contact surface 4a and the holding part 4 is elastically deformed, as a result of which it then rests on the top side of the deposit lock 2 under preload.

The top side of the deposit lock 2 can also comprise a depression which is not shown in the drawing but imaginable to the person skilled in the art, in which the holding part 4 and the magnifying glass 3 are then accommodated in a protected manner.

This protected and sunk accommodation increases the resistance of the design against vandalism since it offers a reduced area of attack.

Figure 2:
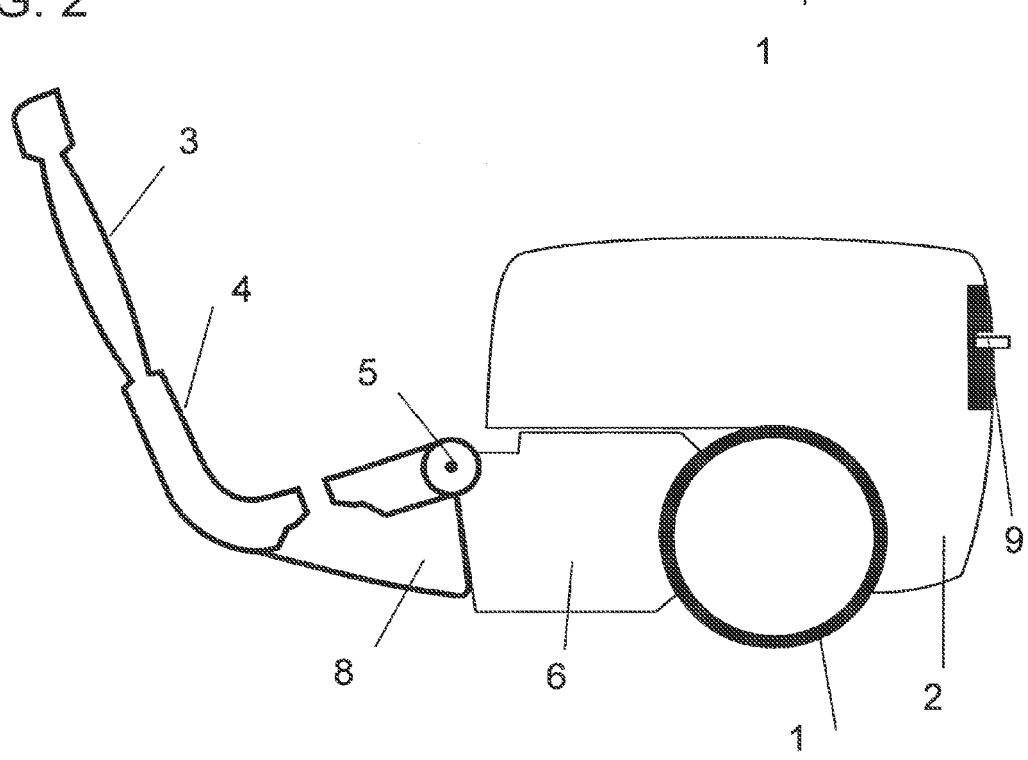
FIG. 2 a first example of the magnifying glass in reading position.

The FIG. 2 shows the magnifying glass 2 in the reading position. Through the inserting of a deposit element 9 the key 7 was released. A possible deposit element is a coin 8 or a customer card.

Thus, the holding part 4 has also been released and has now been pivoted about the bearing 5 so far until the support 8 contacts the clamping part 6.

The magnifying glass 3 now has a slightly oblique position which comfortably allows the user to look at product packages through the magnifying glass 3.

Without further measures of the user the magnifying glass 3 remains in this position as a result of which the user has both hands free.

Instead of carrying a magnifying glass 3 the holding part 4 can also be designed so that it can receive a drinking cup or a so-called electronic shopping assistant during shopping.

Figure 3:
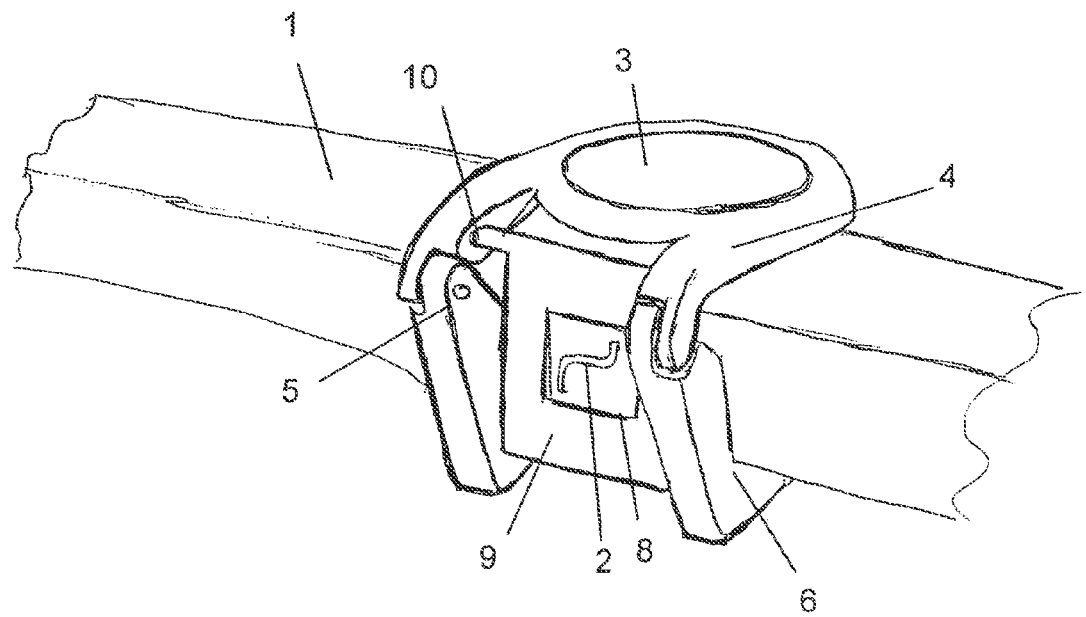
FIG. 3 a second example of the magnifying glass in rest position.

The FIG. 3 shows a further exemplary embodiment of the invention. In a handle 1 a deposit lock is integrated. The deposit lock has an S-shaped key opening 2, in which a key that is not shown here can be inserted. The magnifying glass 3 is integrated in a holding part 4. The holding part 4 is rotatably held by a bearing 5.

In the drawn embodiment, the bearing 5 is located on a clamping part 6. This clamping part 6 is connected to the handle 1. Since the clamping part 6 is a part independent of the remaining deposit lock, this solution provides the advantage that an existing deposit lock can be quickly and cost-effectively retrofitted with a magnifying glass in that solely the clamping part 6 is attached to the deposit lock.

Likewise it is obviously possible to assemble a deposit lock with a magnifying glass during the initial assembly.

FIG. 3 shows a sliding part 9 which has a window-like recess 8. Behind the recess 8 is located the key opening 2 of the deposit lock, in which a key of another deposit lock can be inserted in the known manner.

The key inserted in the deposit lock is likewise held in the known manner and by a holding mechanism in the interior of the deposit lock for as long as no deposit item is present in the deposit lock. For the sake of clarity, the representation of the holding mechanism has been omitted since this is known anyway to the person skilled in the art.

The sliding part 9 is connected to the clamping part 6 via a bearing 10. The kinematic conditions are designed so that the opening 8 of the sliding part 9 exposes the access to the key opening 2 only when the magnifying glass 3 rests on the top side of the deposit lock.

Only in this position is it possible to insert a key in the key opening 2 and then again remove the deposit item present in the deposit lock.

In the typical situation, when the shopping cart is returned to a collecting point for shopping carts in the known manner, the user first has to put the magnifying glass 3 in the protected rest position.

Figure 4:
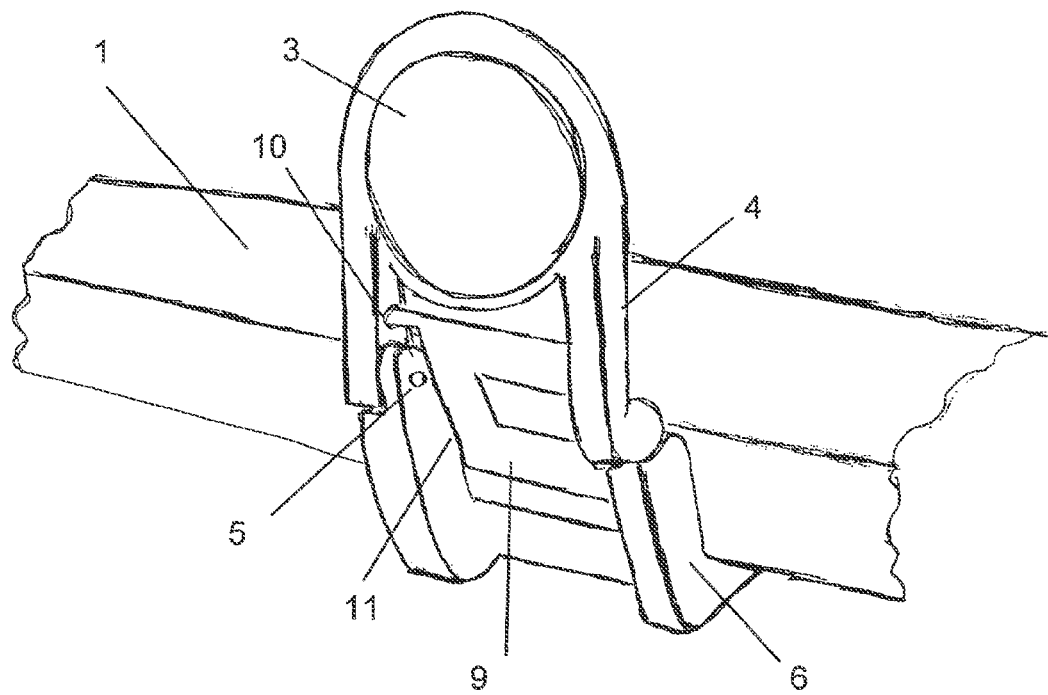
FIG. 4 a second example of the magnifying glass in reading position.

The FIG. 4 shows the magnifying glass 3 in the reading position. The holding part 4 relative to the rest position has been pivoted by approximately 90 degrees. Through the pivoting of the holding part 4 the bearing 9 has also moved relative to the handle 1.

Through this movement of the bearing 10 the sliding part 9 was slightly shifted upward. The sliding part 7 is guided in a groove 11 and follows the movement of the holding part 4. In the reading position of the magnifying glass 3 the insertion of a key is not possible since the opening 8 is now located in another position and no longer exposes the key opening 2.

Without further measures of the user, the magnifying glass 3 remains in this reading position as a result of which the user has both hands free.

Through the present invention it is possible that the user can put the magnifying glass in the reading position if required during the shopping and also back again into the rest position, for example when the user wishes to place bulky items extending over the handle 1 into the basket of the shopping cart.

In principle, the design according to the invention is suitable for all application cases in which a holder is to be made available for any additional element during the use of the shopping cart and this holder is to be protected from external effects with a shopping cart parked off.

The invention can be commercially employed wherever an additional element is to be made available to the user of a shopping cart.

Functionally, the invention can be described such that a magnifying glass attached to the shopping cart can only be brought out of a protected rest position into the reading position when no key is inserted in the deposit lock and the key can only be inserted into the lock when the magnifying glass has assumed the protected rest position.

The invention claimed is:

1. A shopping cart having a pushing handle and a deposit lock assigned to the shopping cart, comprising:
   a magnifying glass pivotally mounted on the shopping cart via a pivot mechanism on the pushing handle or via a pivot mechanism on the deposit lock assigned to the shopping cart;
   said magnifying glass being pivotable to assume a rest position in which said magnifying glass contacts the pushing handle or a housing of the deposit lock in a protected manner, said magnifying glass being fixed in the rest position when a key is inserted in the deposit lock; and
   said magnifying glass being pivotable to assume a reading position in which said magnifying glass is spaced from the pushing handle or from the housing of the deposit lock and in which said magnifying glass is enabled for comfortable see-through operation.

2. The shopping cart according to claim 1, wherein said magnifying glass assumes the rest position when the shopping cart is pushed into another shopping cart.

3. The shopping cart according to claim 1, wherein said magnifying glass must have first assumed the rest position before a deposit coin or token can be removed from the deposit lock.

4. The shopping cart according to claim 1, which comprises a sliding part disposed to selectively cover an opening of the deposit lock for inserting the key into the deposit lock.

5. The shopping cart according to claim 4, wherein said sliding part is disposed to cover the key insertion opening of the deposit lock when said magnifying glass is in the reading position and said sliding part is disposed to expose the key insertion opening of the deposit lock when said magnifying glass has assumed the rest position.

6. The shopping cart according to claim 4, wherein said sliding part is disposed to cover the key insertion opening of the deposit lock when said holding element is in the working position and said sliding part is disposed to expose the key insertion opening of the deposit lock when said holding element has assumed the rest position.

7. A shopping cart having a pushing handle and a deposit lock assigned to the shopping cart, comprising:
- a magnifying glass pivotally mounted via a pivot mechanism on the pushing handle;
- said magnifying glass being pivotable to assume a rest position in which said magnifying glass is protected on the pushing handle;
- a sliding part disposed for selectively covering an opening of the deposit lock for inserting a key into the deposit lock; and
- said magnifying glass being pivotable to assume a reading position in which said magnifying glass is spaced from the pushing handle and in which said magnifying glass is enabled for comfortable see-through operation.

8. The shopping cart according to claim 7, wherein said magnifying glass assumes the rest position when the shopping cart is pushed into another shopping cart.

9. A shopping cart having a pushing handle and a deposit lock assigned to the shopping cart, comprising:
- a holding part for holding an accessory element, said holding part being pivotally mounted on the shopping cart via a pivot mechanism on the pushing handle or via a pivot mechanism on the deposit lock assigned to the shopping cart;
- said holding part being pivotable to assume a rest position in which said accessory element contacts the pushing handle or a housing of the deposit lock in a protected manner;
- a sliding part disposed for selectively covering an opening of the deposit lock for inserting a key into the deposit lock; and
- said holding element being pivotable to assume a working position in which said accessory element is spaced from the pushing handle or from the housing of the deposit lock and in which said accessory element is enabled for operation.

* * * * *